Nov. 15, 1960    A. L. LINDOW ET AL    2,960,332
FLUID SEAL
Filed July 13, 1956

INVENTORS
ARTHUR L. LINDOW
BY RICHARD A. GRAFF
ATTORNEY

United States Patent Office 2,960,332
Patented Nov. 15, 1960

2,960,332
FLUID SEAL

Arthur L. Lindow, Northfield, and Richard A. Graff, Parma Heights, Ohio, assignors to Cleveland Pneumatic Industries, Inc., a corporation of Ohio Filed July 13, 1956, Ser. No. 597,692

3 Claims. (Cl. 267—64)

This invention relates to fluid seals and more particularly to a new and improved packing adapted to provide a fluid seal between two relatively movable parts.

It is an important object of this invention to provide a new and improved packing which is capable of sealing fluids at relatively high pressures with a long trouble free service life.

It is another object of this invention to provide a packing assembly suitable for use at the extremely high pressures which occur in liquid springs and the like.

It is another object of this invention to provide a packing assembly which is capable of self-healing to automatically repair damage in the sealing surface.

It is still another object of this invention to provide a packing assembly wherein the material forming the sealing surface is subject to plastic flow under the operating temperatures and pressures to which the packing is subjected.

It is still another object of this invention to provide a packing assembly wherein the sealing surface is formed of a material which will plastically flow under operating pressures and temperatures to automatically repair and eliminate any flaws or damage in the sealing surface.

It is still another object of this invention to provide a packing assembly having a sealing material which will flow plastically under normal operating pressures and temperatures in co-operation with means which provide sufficient confinement for such material so that the plastic flow will not cause failure of the assembly.

Other objects and advantages will become apparent from the following description and drawings, wherein.

Figure 1:
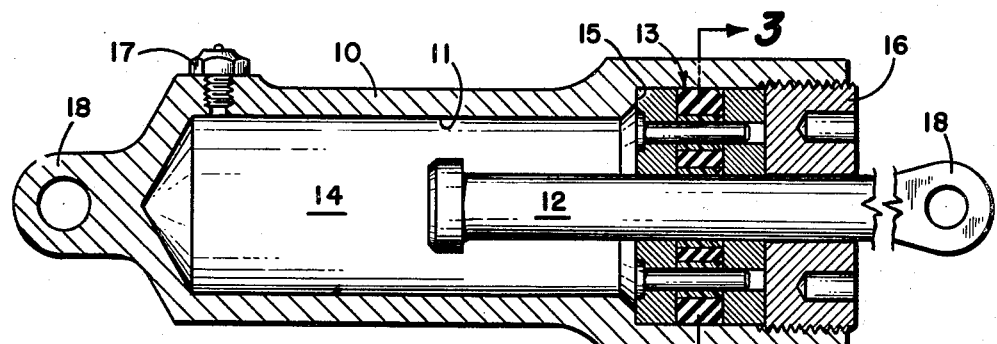
Figure 1 is a side elevation in longitudinal section of a packing assembly according to this invention shown as it should be installed in a liquid spring.

A packing assembly, according to this invention, is particularly adapted for use in liquid springs because of its ability to seal fluid under very wide ranges of pressure which normally occur in such installations. It should be understood, however, that even though the packing assembly is described and shown in conjunction with a liquid spring, it is contemplated that it can be used in many other installations to provide a fluid seal between two relative movable parts, wherein the sealing requirements are not as strenuous as those occurring in liquid springs.

In the U.S. patent to Bingham, 2,308,149, a packing or seal assembly is disclosed which provides a sealing force that increases as the pressure of the liquid being sealed increases. The seal assembly of this patent utilizes a differential area mechanism to increase the sealing pressure as the pressure of the fluid being sealed increases, so that the sealing pressure is always maintained at a value higher than the pressure of the fluid being sealed. The actual sealing material of the device disclosed in the Bingham patent is a resilient packing which is capable of converting an axial pressure applied thereto, into a radial sealing force on a plunger or piston. Because the resilient material, which in most cases is rubber, must act similar to a fluid to transmit pressure in all directions, it is desirable to use a resilient material with a very low modulus of elasticity. This is because the efficiency of force transmission is a function of the modulus of elasticity with greater force transmitting efficiency occurring when the modulus of elasticity is low. However, difficulties occur if the modulus of elasticity is too low, because such materials have a low shear strength and tend to extrude through even very small openings when sufficient pressure is applied thereto. Generally speaking, materials having a higher modulus of elasticity provide better bearing surfaces and also have high shear strength so that they are more resistant to extrusion and wear. Those skilled in the art will therefore realize that the packing of the type disclosed in the Bingham patent should be both soft and hard to ideally perform the various functions of the packing material. The nonexistence of such a material with these mutually exclusive properties has led to the use of a compromise material which does not function in the most desirable manner. Difficulty is also encountered when rubber and the like is used as the packing material because foreign particles tend to be carried by the movable members through the packing and results in tearing or cutting of the sealing surface. The damage from a single particle of foreign matter may not be fatal to the operation of the device because the rubber can usually resiliently deflect and re-establish a fluid seal. However, the damage is cumulative and each time the surface is damaged it adds to the previous damage and weakens the bearing or sealing surface until failure finally occurs. In a packing assembly, according to this invention, a resilient material having a very low modulus of elasticity is used to transmit the axial pressure applied to the packing into radial sealing pressure so very efficient force transmission results. This resilient material applies a sealing force against a plastic material which is used to provide the sealing engagement with the movable part. The plastic material is chosen to provide good wearing properties, and also to provide plastic flow properties which enable the packing assembly to automatically heal itself whenever it is damaged to re-establish a homogeneous sealing surface without residual stresses or flaws. This prevents the cumulative effect of damage to the sealing surface and provides a device which heals and re-establishes a sealing surface which is identical to the original in both sealing and wearing capacity.

Reference should now be made to the drawings wherein a preferred seal assembly, according to this invention, is shown installed in a liquid spring having a body 10 formed with a cylinder bore 11 into which a plunger 12 projects. A seal assembly 13 extends between the body 10 and the plunger 12 and provides a fluid seal therebetween. The body 10, plunger 12, and seal assembly 13 co-operate to define a liquid filled cavity 14, the volume of which is changed by the movement of the plunger 12 axially relative to the body 10. A gland nut 16, threaded into the body 10, axially positions the seal assembly against a shoulder 15 formed in the body 10 and a fill plug 17 opens into the cavity 14 to permit the filling of the cavity 14 with liquid. Mounting lugs 18 are formed on the cylinder body 10 and plunger 12 so that the spring can be connected to the associated equipment.

If the plunger 12 moves to the left, the volume of the cavity 14 is reduced by an amount equal to the displacement change of the plunger 12 and the liquid therein is compressed to a high pressure. This causes an increase force reaction on the plunger 12, urging it to the right relative to the body 10. Conversely, if the plunger 12 moved to the right, the volume of the cavity 14 is increased and the pressure of the liquid contained therein decreases and results in a decrease in the force reaction on the plunger 12. Therefore, the liquid itself within the cavity 14 is compressed to provide the spring action of the device. Because liquid is relatively incompressible when compared with gases and the like, very high pressures must be used to obtain adequate stroke of the plunger 12 and the pressure often reaches 40,000 p.s.i. to 60,000 p.s.i. or more.

Figure 2:
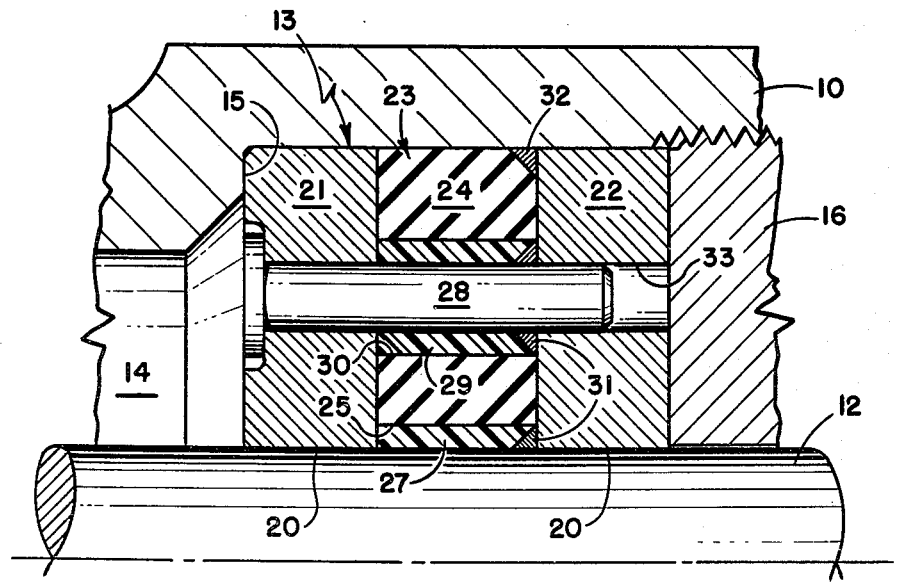
Figure 2 is an enlarged fragmentary longitudinal section showing the structural details of the packing assembly of Figure 1.
Figure 3:
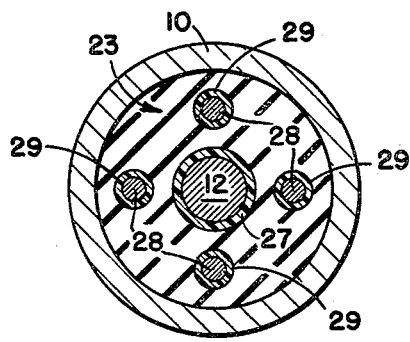
Figure 3 is a cross section taken along 3—3 of Figure 1.

Reference now should be made to Figure 2 for the details of the structure of the seal assembly 13. The seal assembly 13 includes a pressure plate 21, and a back up plate 22 each formed with a central aperture 20 through which the plunger 12 projects. A packing assembly 23 is positioned between the two plates 21 and 22 and includes a disk 24 formed of a resilient material such as rubber having a low modulus of elasticity. The resilient disk 24 is provided with a central aperture 25 coaxial with the apertures 20 of the plates 21 and 22 but of substantially larger diameter to accommodate a plastic sleeve 27. This sleeve, which is of a length substantially equal to the thickness of the disk 24, is closely fitted in the aperture 25 and is of a normal inner diameter calculated to fit closely but freely on the plunger 12.

The pressure plate is provided with a plurality of symmetrically arranged pins 28, which are fixed thereto by any suitable means and extend longitudinally therefrom for free slidable movement within adequate apertures 33 provided in the plate 22. These pins also extend through apertures 30 provided within the resilient disk 24, which apertures are substantially larger than the diameters of the pins 28. In each aperture is also mounted a plastic sleeve 29 adapted to normally fit closely but freely on the pins 28. The pins 28 are provided as a mechanism for reducing the effective area of the disk 24 and function in the manner hereinafter described.

The sleeves 27 and 29 are preferably formed of a plastic material having good bearing characteristics as well as the property of plastic flow at the normal pressures and temperatures encountered. This material should also have sufficient shear strength to prevent its extrusion out along the clearance around the plunger 12 and pins 28. In liquid spring applications wherein the pressures are extremely high, it is normally desirable to provide anti-extrusion rings 31 to reduce the amount of clearance around the plunger 12 and the pins 28 so that extrusion will not take place under the very high pressures which are encountered. An additional anti-extrusion ring 32 is provided at the joint between the cylinder body 10 and the back up plate 22 to prevent extrusion of the resilient disk 24 through the clearance therebetween.

In operation, the liquid within the cavity 14 produces a force on the pressure plate 21 which is a function of the pressure of the liquid times the area of the pressure plate. This force produces an axial force reaction which tends to squeeze the packing assembly 23 axially toward the back up plate 22. The pins 28 extend loosely into the apertures 33 formed in the back up plate 22 so that they are unsupported by the back up plate 22 and the disk 24. The liquid force on the pressure plate 21 creates an internal pressure in the packing assembly 23 and since the effective area of the packing assembly 23 is less than the effective area of the pressure plate 21 by an amount equal to the sum of the cross sectional areas of the pins 28, the packing assembly is at a higher pressure than the pressure of the liquid within the cavity 14. In other words, the ratio of the packing assembly pressure relative to the liquid pressure is equal to the ratio of the area of the pressure plate 21 relative to the effective area of the packing assembly 23. Because the disk 24 is formed of a resilient material having a low modulus of elasticity it efficiently transmits the axial force applied by the pressure plate 21 into a radial sealing force which urges the sleeve 27 into sealing engagement with the plunger 12 and the sleeves 29 into sealing engagement with the pins 28. The pressure of the sealing engagement will be greater than the pressure of the liquid being sealed thereby resulting in an adequate seal regardless of the pressures encountered. While the pins 28 have been used to produce a differential area mechanism for providing a sealing pressure greater than the fluid pressure, it is to be understood that other known means for producing this result could be used.

As the plunger 12 moves axially relative to the body 10, foreign particles may be carried by the plunger through the packing assembly 23, resulting in a cutting or tearing action on the sleeve 27. As soon as this occurs, the sleeve 27 will plastically flow under pressures encountered to heal the damage and provide a homogeneous sealing surface wherein substantially no resilient strains remain. If a material such as rubber, which does not exhibit plastic flow under normal operating pressures and temperatures, were used as the sealing material, there would be a resilient deflection to close a rupture caused by the foreign particle. Such resilient deflection would re-establish sealing, but the damage would remain, due to the fact that the rubber would not plastically flow into the rupture but rather would retain resilient stresses. If additional foreign particles pass through such a resilient seal, the damage would add to the previous damage and eventually failure would occur. However, when the sealing is re-established by plastic flow, resilient stresses do not remain after the rupture and the sealing surface is healed resulting in a homogeneous sealing surface. Therefore, there is no tendency for the damage of the later foreign particles to add to the previous damage.

The plastic material used to form the sleeves 27 and 29 should have a higher modulus of elasticity and shear strength than the material used to form the resilient disk 24 so that it will resist extrusion out under the anti-extrusion rings 31. Because the sleeve 27 is substantially totally confined by the plunger 12, pressure plate 21, anti-extrusion ring 31, and resilient disk 24 and the sleeves 29 are substantially totally confined by the pins 28, pressure plate 21, anti-extrusion ring 31 and disk 24, the fact that the sleeve material will flow plastically does not cause difficulty because it has essentially nowhere to flow. It should be understood that there is some clearance around the anti-extrusion ring 31 through which material could extrude if the sufficient shear strength is not present so the sleeves are not confined in the complete sense of the word. That is the reason shear strength of the sleeve material should be higher than the shear strength of the disk 24. If smaller pressures are encountered, larger clearances can be tolerated for a given sleeve material.

In practice, we have found that a soft rubber is suitable for use as the resilient material for the disk 24 and the sleeves 27 and 29 have successfully been made of Teflon, which is a polymerized tetrafluoro ethylene made by the E. I. du Pont Company. It is believed that the structural formula is

with the exact degree of polymerization unknown. Of course, other material having the critical properties described above may be used.

Although a preferred embodiment of this invention is illustrated, it will be realized that various modifications of the structural details may be made without departing from the mode of the operation and the essence of the invention. Therefore, except insofar as they are claimed in the appended claims, structural details may be varied widely without modifying the mode of operation. Accordingly, the appended claims and not the aforesaid detailed description are of the scope of the invention.

We claim:

1. In a liquid spring including a cylinder filled with liquid and a plunger moveable into said cylinder to compress the liquid, the combination therewith of a gland assembly for providing a fluid seal between said cylinder and plunger comprising a mass of plastic viscous material surrounding said plunger, and means compressibly confining said material against said plunger and compressing said material to a pressure higher than the pressure of a liquid in said cylinder.

2. In a liquid spring including a cylinder filled with liquid and a plunger moveable into the cylinder to compress the liquid, the combination therewith of a gland assembly for providing a fluid seal between said cylinder and plunger comprising a ring of polymerized tetrafluoro ethylene engaging said plunger, and means completely confining said ring against said plunger and pressuring said ring to a pressure higher than the pressure of the liquid and higher than the pressure required to produce viscous plastic flow of said ring at normal operating temperatures.

3. In a liquid spring including a cylinder member filled with liquid and a plunger member moveable into said cylinder member to compress the liquid, the combination therewith of a gland assembly for providing a fluid seal between said members comprising a mass of plastic viscous material engaging one of said members, and means compressibly confining said material against said one member and compressing said material to a pressure higher than the pressure of a liquid in said cylinder.

References Cited in the file of this patent
UNITED STATES PATENTS

| | | |
|---|---|---|
| 2,308,149 | Bingham | Jan. 12, 1943 |
| 2,567,527 | Parks | Sept. 11, 1951 |
| 2,749,193 | Traub | June 5, 1956 |
| 2,799,523 | Parker | July 16, 1957 |